INVENTOR
Albert J. Scholtes

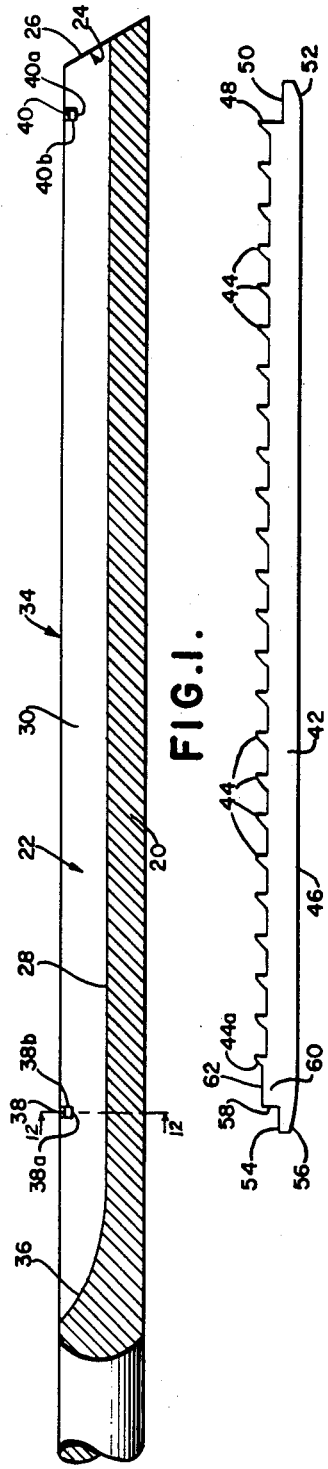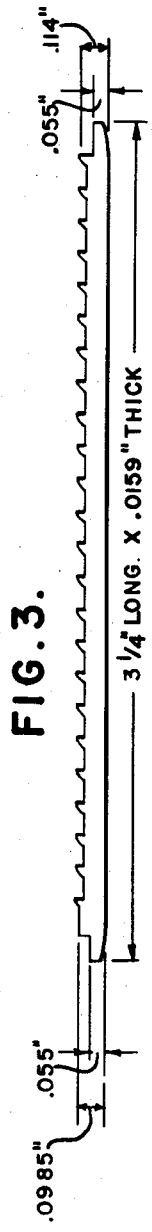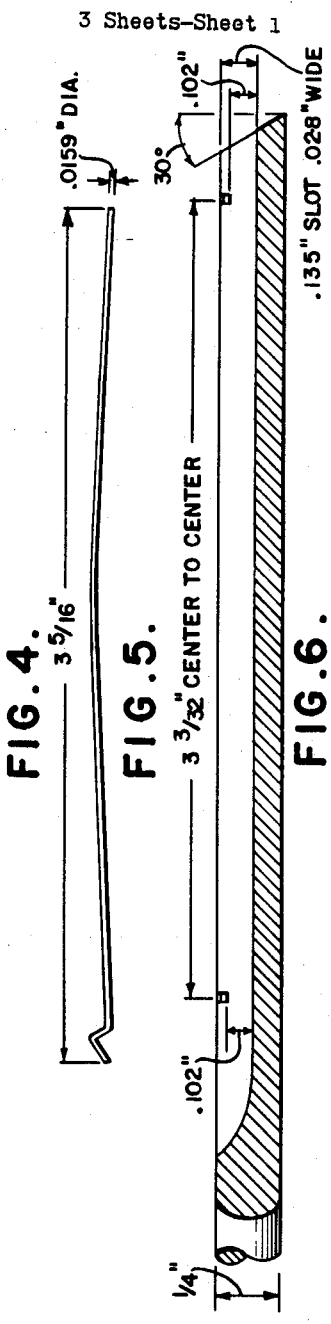

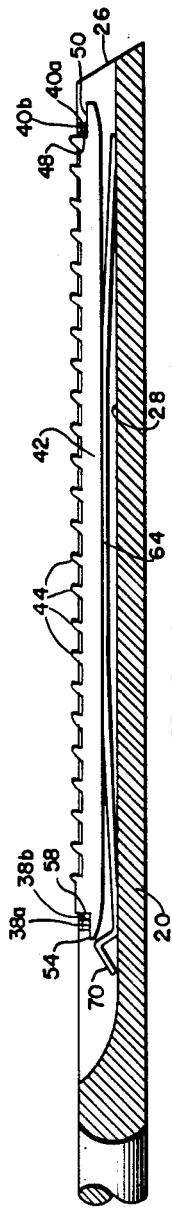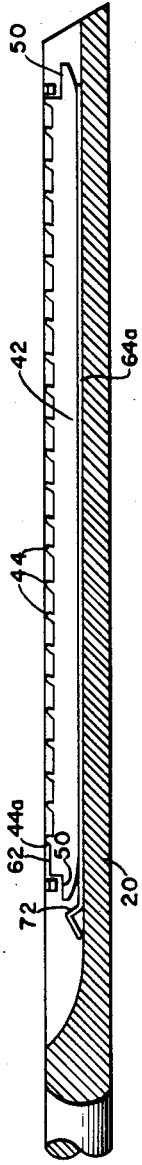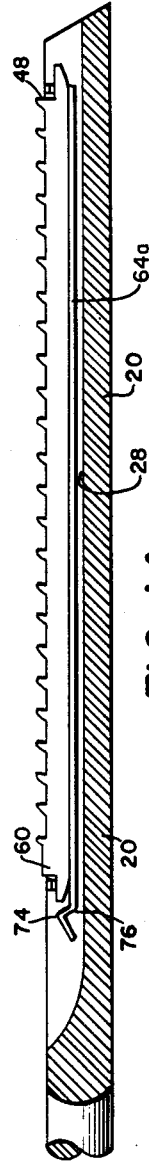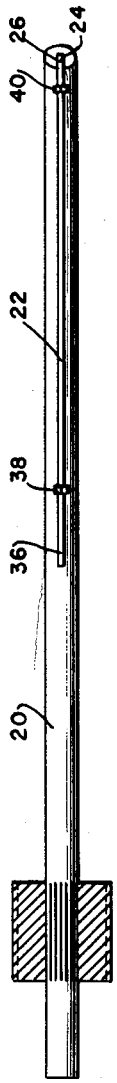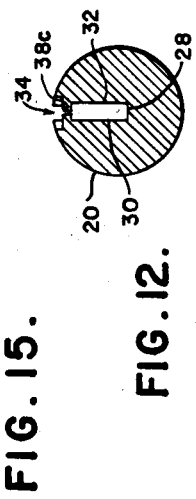

United States Patent Office 3,142,143
Patented July 28, 1964

3,142,143
PICKING SPINDLE FOR COTTON PICKER
Albert J. Scholtes, 714 Ohio Ave., Corpus Christi, Tex.
Filed Jan. 22, 1963, Ser. No. 253,218
17 Claims. (Cl. 56—50)

The present invention relates to picking spindle for cotton picker and has for objects the objects stated in my similarly entitled prior Patent No. 3,017,734, granted January 23, 1962, and my similarly entitled co-pending application Serial No. 149,987, now Patent 3,096,607, filed November 3, 1961, and in addition has other objects as follows:

To fill the demand by cotton picking machine operators for a spindle in which assembly, removal and replacement of the barb units could all be accomplished in the field on the job while the spindle is in the machine.

To facilitate the above field operation by providing a spindle free from rust or corrosion potential inasmuch as cotton picking machines are left in the fields over extended periods of time.

To produce a spindle and barb unit capable of picking the cotton without the requirement for application of moisture.

To reduce the time element involved in changing the barb system and to reduce cost of materials and manufacture by designing parts capable of being turned out economically in automatic machines.

To provide a dry picking spindle adaptable to a standard chain or drum type of picking machines.

To provide a barb system which can be used on either straight or tapered type spindles.

To provide a barb system which can be operated by either spring or centrifugal force to project the barbs.

To provide a barb system in which the doffing resilience of the barbs can be nicely adjusted and accordingly can be used with the rubber or steel blade doffing system of current machines without cutting or unduly wearing the rubber of that type of doffing system.

To provide a system which does not depend upon sharpness of the barbs for picking the cotton as sharpness is not needed in the barb points.

To provide a spindle in which the barb system is capable of being made of completely rust proof material to the end that tags on the barb points are eliminated.

To provide a system which does not require right and left hand spindles but in which the spindles will equally operate in either direction of rotation.

To provide a spindle having its surface ground and polished to facilitate doffing without pulling off the friction rollers.

To provide a spindle having its outer end cut at an angle of the order of thirty degrees whereby such end will not bore into the green boles or into the plant stalks, this angle also causing the bole pod to vibrate so that the point of the spindle will find its way into the boles of the stormproof type of cotton which, when matured, does not have a fully open bole pod.

To provide spindles shaped to avoid picking up stems or leaves from the boles but act to pick the cotton exclusively resulting in a cleaner, higher grade of cotton.

To provide a complemental spindle and barb system that can be substantially instantly assembled or repaired by the machine operator in the field without the use of special tools, and in which the barb system can be replaced in the field at small cost without replacing the spindle body.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a fragmentary longitudinal sectional view taken on an enlarged scale, of a form of spindle constructed in accordance with the invention.

FIGURE 2 is a side elevational view of a form of barb blade or bar pursuant to the invention.

FIGURE 3 is a side elevational view of a form of elastic member.

FIGURES 4, 5 and 6 are views similar to FIGURES 1, 2 and 3 illustrating preferably commercially acceptable dimensions of parts.

FIGURES 7, 8, 9, 10 and 11 are schematic views showing preferred steps in the mode of assembly.

FIGURE 12 is a cross-sectional view taken on an enlarged scale on the line 12—12 of FIGURE 1.

FIGURE 13 is a view similar to FIGURE 11 showing a modified construction in which centrifugal force, rather than elastic tension, is employed to yieldably project the barb member and barbs in an outward direction relatively to the spindle slot.

FIGURE 14 is a view similar to FIGURE 13 showing the projected position of the barb blade and filler member.

FIGURE 15 is a top plan view of the spindle including the drive member.

Figure 7:
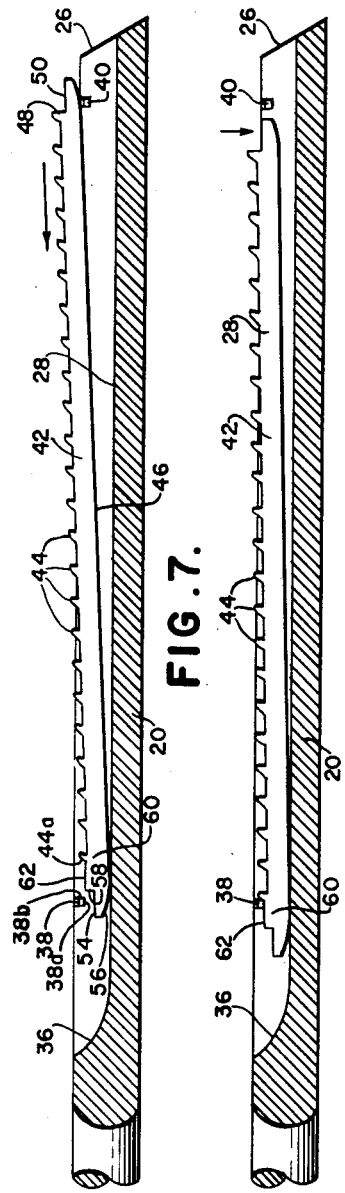

Referring more particularly to the drawings, 20 designates a spindle body as representative of any type of spindle, straight or tapered, and of any conventional form, having a substantially solid body in which is produced an axially running slot 22 which may have its front end 24 opening through the tip or free end 26 of the spindle, which latter is inclined on an angle preferably of the order of thirty degrees calculated from a transverse plane laterally intersecting the end of the spindle at either end of the inclined tip.

The slot, in a transverse direction, is preferably substantially radial, having a base 28 which may be rounded in cross section, side walls 30 and 32, and an open mouth 34 which opens on the periphery of the spindle body 20.

The slot 22 will ordinarily be produced by a slotting saw which after running in axial direction from the tip of the spindle for the predetermined length of the slot is run off through the mouth of the slot producing a rear curved lead-in channel 36 leading from the surface of the spindle gradually downward and forward until communicating with the rear end of the slot 22.

Rear and front stop members 38 and 40 are provided crosswise of the slot at a calculated axial distance apart, the rear stop member 38 being forwardly of the lead-in channel 36 and the front stop member 40 being preferably set inwardly of the bevelled or inclined tip 26.

The rear stop member 38 has an inner abutment surface extending substantially axially or substantially parallel to the slot base 28 and a transverse abutment surface 38$^b$ extending substantially radially on the front portion of the rear stop member 38.

In like manner, the front stop member 40 has an inner abutment surface 40$^a$ extending axially of the spindle and parallel with the base 28 of the slot, and a transverse abutment surface 40$^b$ substantially radially of the front stop member 40 at the rear face thereof. The stop members 38 and 40 may be slightly below the surface of the spindle body 20 at their outer portions.

In this form of the invention the stop members 38 and 40 bridge the slot 22. However, it is not necessary that these stop members 38 and 40 extend completely across the full width of the slot 22. It will be sufficient that the stop members 38 and 40 be formed by indentations 38$^c$ and 40$^c$ of the spindle body made from opposite sides of the slot mouth 34 to upset metal of the side walls 30 and 32 sufficient distances toward one another to leave between them gaps narrower than the thickness of the barb member 42 which is accommodated in the slot 22 and carries the barbs 44 at its outer edge adapted to be projected and retracted through the open slot mouth 34 incident to the radial or transverse movement of the barb member 42 in the slot.

The barb member 42 in the form of the invention illustrated in the drawings is a thin, flat blade or bar which may also be sidewise flexible. This barb member 42 is an elongated single member carrying, as a gang or plurality, all of the barbs 44 which are preferably integral with the barb member 42.

The inner edge 46 of the barb member 42 is adapted to initially rest upon the bottom or base 28 of the slot 22, in which position the barb height is greater than the distance between the slot base 28 and the inner abutment surfaces 38ᵃ and 40ᵃ of the rear and front stop members 38 and 40, but less than the slot depth 22, whereby the forward transverse edge 48 of the most forward barb 44 will act as a stop member coacting with the transverse abutment surface 40ᵇ of the front stop member 40 to avoid axial sliding of the barb member 42 in the slot forwardly when such edge 48 has encountered the transverse abutment surface 40ᵇ. The forward transverse edge 48 thus constitutes a stop member and the transverse abutment surface 40ᵇ also constitutes a complemental stop member.

Extending forwardly from the inner edge of the stop member 48 is a stop shoulder 50 extending forwardly to the forward end of the barb member 42. The inner edge 46 of the barb member 42 is inclined or curved upwardly as indicated at 52 to the level of the stop shoulder 50.

The front stop shoulder 50 is stepped down from the height of the tip ends of the barbs 44 so that in the transversely projected position of the barb member 42 the front stop shoulder will engage the inner abutment surface 40ᵃ of the front stop member 40, thus arresting further outward transverse or radial movement of the barb member 42 at a position calculated to cause projection of the barbs 44 an operative distance beyond the perimeter of the spindle body 20.

At the other or rear end of the barb member 42 the same is provided with a similar rear stop shoulder 54 at preferably the same height as the front stop shoulder 50. This rear stop shoulder 54 is adapted to coact with the inner abutment surface 38ᵃ of the rear stop member 38 for the same purpose of limiting the outer transverse movement of the barb member 42 in the slot 22. At the rear lower portion of the barb member 42 the inner edge 46 is also inclined or curved upwardly and rearwardly as indicated at 56 for a purpose later described. The rear end of the barb member 42, forwardly of the rear stop shoulder 54, is provided with a stop member 58 formed by a rear transverse edge of a fillet or blank portion 60 of the barb member 42. This rear transverse edge 58 is adapted to abut the transverse abutment surface 38ᵇ of the rear stop member 38 when the barb member 42 is caused to move outwardly of the slot 22 as by centrifugal force generated by rapid rotation of the spindle, or through the use of an elastic member or means interposed between the inner edge 46 of the barb member 42 and the base wall 28 of the slot 22 as hereinafter described.

The upper edge 62 of the fillet 60 is stepped down from the barb line 44 so that the barb 44 rearmost in position projects up above the fillet 60 and is adapted to encounter the transverse abutment surface 38ᵇ of the rear stop member 38 in accordance with a preferred pattern of assembly as hereinafter described. The upper fillet surface 62 is stepped up from the rear stop shoulder 54 resulting in the form of the rear transverse edge or stop member 58.

A suitable elastic means or device may be placed in the slot 22 below the barb member 42 to urge the stop shoulders 50 and 54 yieldably outward against the inner abutment surfaces 38ᵃ and 40ᵃ, and a suitable elastic device consists of a metallic or other wire or rod 64 having a plain end 66 and a crimped or humped end 68 which latter may be formed by two downwardly diverging legs 70 and 72. The rear or terminal leg 70 forms with the forward leg 72 and inverted V or angular connection 74. The rear end of the elastic member 64 joins with the inner end of the forward leg 72 in an angular crimp 76. While legs 70 and 72 may be of unequal length the lower free edge of leg 70, the crimp 76 and the free front end 66 should all be in the same plane so as to all simultaneously rest upon the slot base 28.

The elastic member 64 may be substantially straight, but preferably bowed, the convex side being presented below the inner edge 46 of the barb member 42. This elastic wire or rod 64 will be sufficiently flexible to permit its entry through the curved lead-in channel 36 with the plain end 66 leading in order to arrive at a position beneath the barb member 42.

The following metal types are preferred for reasons stated as follows:

The roller will preferably be made from leaded cold rolled steel for the reason that this steel can be cut forty-five percent faster than the cutting of the free cutting type of steel.

The spindle body is preferably made from 17–4–PH, a precipitation hardenable stainless steel, condition A, annealed 150,000 pressure per square inch. When heat treated at a temperature of the order of 900°, the pressure per square inch is 190,000 to 210,000, which is about three times the tensile strength of the carbon steel in use. This particular steel is shipped center less ground and polished for the best surface finish available.

The spring is preferably of work hardening 302 stainless steel shipped at spring temper and is .0159″ diameter wire.

The barb blade or bar and barb units are preferably of spring tempered bronze Olin=106-alloy. Such material is used because it can be readily stamped in a die, and this type of bronze has the best abrasion resisting quality.

The spindle body 20 is heat treated by being brought up to a temperature of 850° to 900° in an electric furnace, being maintained at this temperature for a period of time of the order of five to ten minutes, thereupon removed and air quenched. This treatment will result in a spring hardness of 42 to 45 points of C-Rockwell hardness. It will be noted that the temperature stated is low for this type of treatment, but has the advantage that metal so treated will not warp or scale during the treating. Treatment of this kind is usually conducted at a range of 1550° to 1600°, which is well above the scaling point of the metal, with the result that the metal would have to be reground for finish due to the scaling and pitting of its outer surface.

The body of the spindle is preferably cut from a long bar down to eight inches in length, with one end cut at a 30° angle, following which the slot 22 is cut at an approximate width of .028″ and a depth of .135″, and a length of 3⅞″ including the runout point of the slotting saw which forms the lead-in channel 36.

Thereupon the bridge stops 38, 40 are installed 3³²⁄₃₂″ apart. The inner abutment or stop surfaces 38ᵃ and 40ᵃ are placed above the base or bottom of the slot 28 a distance of .102″.

The roller knurled point is then knurled in a special automatic machine which raises the metal at that point from .007″ to .010″ in a ¼″ diameter of spindle body. The roller is forced on at this point, which is done after heat treating of the spindle.

The barb blade or bar 42 is stamped in a die from bronze strip 3¼″ wide x .0159″ thick material. After stamping, the barb blade or bar will preferably be .114″ wide from the top of the teeth or bars 34 to the bottom line 46 of such barb and 3¼″ long.

Other preferred dimensions are shown in FIGURES 4, 5 and 6. These dimensions are only exemplary and not critical in all detail, but relationships of dimensions are preferably preserved, inasmuch as devices according to the invention in these specifications of the dimensions have been used with success in actual practice.

Figure 8:
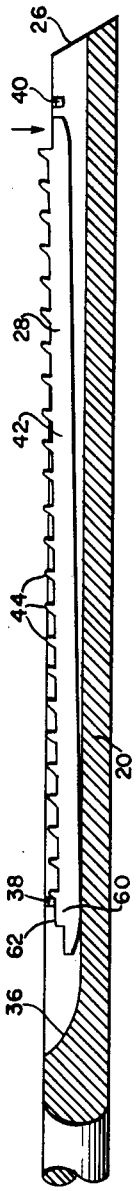
Figure 9:
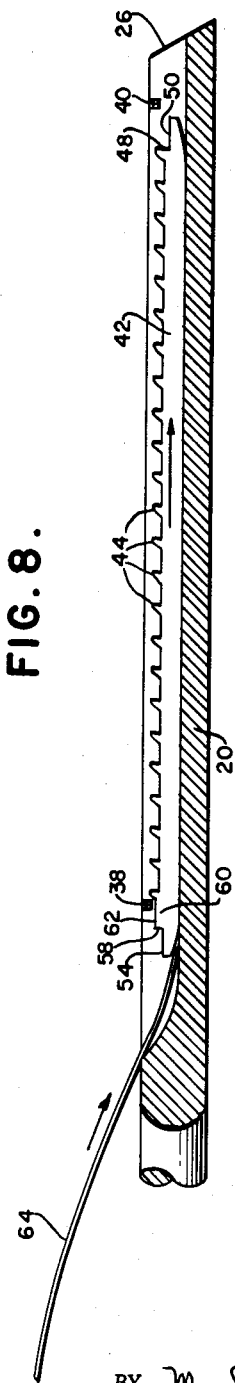

Referring more particularly to FIGURES 7 to 11, inclusive, the method of assembly is preferably as follows:

As shown in FIGURE 7, the barb blade 42 is caused to assume a substantially diagonal position above the mouth 34 of the slot 22 in the spindle 20. With the rear end of the blade 42 leading and the lower edge 46 of the blade resting and sliding upon the forward stop bridge 40, the blade 42 is moved rearwardly or to the left in FIGURE 7 with the fillet 60 passing beneath the rear bridge stop 38 until the rear edge 44$^a$ of the rearmost bar encounters the forward wall or stop surface 38$^b$, at which point, due to relative length of the blade 42 and the distance apart of the bridge stops 38 and 40, the forward end of the blade 42 will have cleared the forward bridge end stop 40 as shown in FIGURE 8: whereupon the barb member or blade 42 may descend to the bottom 28 of the slot 22 as shown in FIGURE 9. This FIGURE 9 shows that when the barb blade 42 is resting upon the base 28 of the slot, the tips of the bars 44 rise above the horizontal level of the inner abutment stop surfaces 38$^a$ and 40$^a$ of the two bridge stop 38 and 40, thereby limiting forward axial sliding movement of the barb blade 42. At this position (FIGURE 9), the upper longitudinal surface 62 of the fillet 60 is spaced below the inner stop abutment surface 38$^a$.

At this stage, as also shown in FIGURE 9, the flexible elastic member 64 is introduced, with its plain end 66 leading, in a forward motion down through the curved lead-in channel 36 and into the base 28 of the slot 22. As shown in FIGURE 9, this forward plain end 66 of the flexible and elastic wire 64 first encounters the bevelled or curved surface 56. Further pushing of the elastic wire 64 down into and forwardly of the slot will cause a forward longitudinal shifting of the barb blade 42 from the position of FIGURE 9 to that of FIGURE 10, such forward movement being arrested when the stop forward edge 48 of the most forward barb 44 abuts against the transverse stop abutment surface 40$^b$ of the bridge stop 40. In this shifted position of FIGURE 10, the stop shoulders 50 and 54 of the barb blade 42 will align directly inward of the stop abutment surfaces 40$^a$ and 38$^a$. While the plain leading end 66 of the elastic wire 64 will tend to slide under the radius surface 56 and lift the inner end portion of the barb blade 42 upwardly, the weight of the barb blade 42 and the frictional engagement between the elastic wire 64 and the surfaces 56 and 46 of the barb blade 42 will be sufficient to cause forward shifting of the barb blade from the position of FIGURE 9 to that of FIGURE 10 incident to the initial engagement between the entering end 66 of the elastic wire 64.

Figure 10:
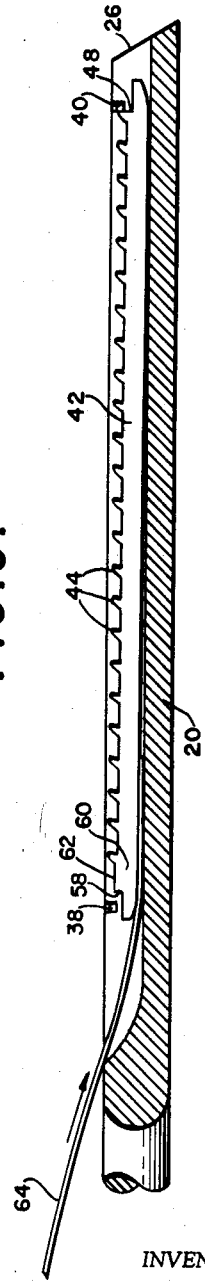

However, when the barb blade 42 becomes arrested as to any further forward axial shifting, as shown in FIGURE 10, by the continued pushing forwardly of the elastic wire 64, such wire will be progressively moved beneath the barb blade 42, lifting the barb blade 42 in the slot, which position is shown in FIGURE 11, where the tips of the barbs 44 project out through the mouth 34 of the slot 22 beyond the perimeter of the spindle body 20 an operative distance for picking cotton due to the bowed amount of the spring. This operative distance is determined by the height of the barb tips above the stop shoulders 54 and 50.

Where the elastic wire is bowed upwardly, the insertion of the wire beneath the barb blade 42 as shown in FIGURE 11 will stress the elastic wire, whereby the barb blade 42, including the barbs 44 will be yieldably projected in an outward direction relative to the slot. The tension, however, will be a light, delicate one, in which light pressure on the projecting tips of the barbs will be sufficient to depress the barbs inwardly accompanied by a compressive action of the spring 64. When the depressing force is removed, the spring 64 will automatically urge the barbs again out into operative position.

FIGURE 13 is a view similar to FIGURE 11 with the use of a straight member 64$^a$ which may not be elastic and is devoid of any bowed or offset portion so that it acts merely as a filler to raise the barb blade 42 a limited extent in the slot but not up to a point where the stop shoulders 50, 54 engage the stop surfaces 40$^a$ and 38$^a$, but act as locking means of axial movement. In this figure the tips of the bars 44 have not yet reached a projected position but are contained wholly within the perimeter of the spindle.

In this case it will be noted that while the thickness of the straight wire 64$^a$ is not sufficient to abut the shoulders 50, 54 against the stop surfaces 40$^a$, 38$^a$, it will be sufficient to lap the stop wall 58 with the stop surface 38$^b$ of the rear bridge stop 38 which will prevent any casual or accidental longitudinal sliding of the barb blade 42 in rearward direction. Longitudinal sliding movement of the barb blade 42 forwardly in the slot is substantially prevented by the engagement of stop walls 48 and 40$^b$. It will be understood that the distance between the end stops 48 and 58 may be slightly less than the distance between the transverse stop abutment surfaces 40$^b$ and 38$^b$. In other words, there is preferably a tolerance allowed between these complemental stops at forward and rear ends of the barb blade 42 to insure that the stop walls 48 and 58 can move into lapping engagement with the respective bridge stop walls 40$^b$ and 38$^b$ when the barb blade 42 has shifted to its full forward position (stop 48 against stop 40$^b$) incident to entry of the wire 64 or 64$^a$ into the slot beneath the blade.

In the operation of the device according to FIGURE 13, the rotating movement of the spindle will generate centrifugal force which will manifest itself in throwing the barb blade 42 in a radial outward direction within limits provided by the stops 50, 40$^a$, and 54, 38$^a$.

Accordingly, in this arrangement, centrifugal force generated by spindle rotation is depended upon to project the barb blade 42 outwardly of the limit of the stops 50, 40$^a$ and 54, 38$^a$, which determine the degree of projection of the barb tips 44 out of the open mouth 34 of the slot.

It will be noted from FIGURES 11 and 13 that the crimped or humped portion of the member 64 is oriented to a position where the elbow 74 is uppermost. In the final home position of the member 64, this elbow 74 will occupy the lower portion of the lead-in channel 36 and it affords a loop for grasping in the fingers or by an implement to permit ready withdrawal of the member 64 or 64$^a$ for repair or replacement to such member 64 or to the barb blade 42. After withdrawal of the member 64 or 64$^a$, the barb blade 42 will again drop to the bottom 28 of the slot whereby, by a rear longitudinal sliding movement of the blade, the fillet 60 may be again moved under the bridge stop 38 as shown in FIG. 9 whereupon the front end of the barb blade 42 may be lifted clear of the forward bridge stop 40 and the barb blade 42 slid diagonally out of the mouth of the slot.

The fillet 60 serves two functions: it provides a transverse free wall 58 upstanding from the forward end of the rear stop shoulder 54, and it also spaces the transverse wall 58 from the rearmost barb 44$a$, as shown in FIGURE 7, to provide the necessary longitudinal rearward lost motion of the barb blade 42 necessary to secure clearance of the forward portion of the barb blade 42 with respect to the front bridge stop 40.

The hump or crimped end of the elastic wire 64 engages the side walls of the lead-in channel and slot and thus prevents turning of the wire on its axis with adverse effect on its elastic action as the bow spring part would tend to rotate out of its upper vertical position.

Due to the hump or crimped end the wire tends to be supported in the slot and channel only on two points, namely the free plain tip end and the lower end of the long leg, the crimp at the lower end of the short leg not reaching a sufficiently low point: thus in entering the wire below the barb member the wire would have to be elastically stressed throughout its length to and including the hump or crimped end. In other words the hump or crimped end would have to be distorted, thus enhancing the stress and potential strain which becomes stored in the distorted elastic wire.

The invention permits of the assembly of both the barb means and filler or elastic member after installation or formation of the bridge stops which enables completion of manufacture of the spindle independently of the manufacture of the barb blade and wire, all due to the novel construction of the barb blade and wire and the consequent novel order of assembly of the various components.

Although I have disclosed herein the best form of the invention known to me at this time, I reserve the right to all such modifications and changes as may come within the scope of the following claims.

What is claimed is:
1. A cotton picking spindle comprising
  (a) a spindle body having
  (b) an elongated slot having
  (c) an open mouth opening transversely through the outer surface of the body and
  (d) at least one open end,
  (e) barb means slidable transversely in the slot,
  (f) stop means between the spindle body and the barb means for arresting outward movement of the barb means at a position where the barbs operatively project beyond the spindle body, and
  (g) elastic means separate from the barb means adapted to be introduced longitudinally through the open end of the slot beneath the barb means for yieldably urging the barb means outwardly to substantially the limit of said stop means.

2. A cotton picking spindle according to claim 1 in which
  (h) the barb means has also a relative axial movement in the slot, and
  (i) complemental means between the spindle body and barb means for limiting the range of such axial movement.

3. A cotton picking spindle as claimed in claim 1 in which the barb means comprises
  (h) a single thickness elongated member, and
  (i) a barb gang in common on said elongated member.

4. A cotton picking spindle as claimed in claim 1 in which the barb means comprises
  (h) a single elongated blade,
  (i) a plurality of barbs on the blade,
  (j) said stop means being located at opposite end portions of the blade.

5. A cotton picking spindle as claimed in claim 1 in which said elastic means comprises
  (h) a bow spring, and
  (i) means entrained with the elastic means to prevent turning of the bow spring.

6. A cotton picking spindle as claimed in claim 1 in which said elastic means comprises
  (h) a resilient bowed wire having a plain leading end and
  (i) an offset trailing end for cooperating with the walls of the slot to resist rotation of the wire in the slot.

7. A cotton picking spindle as claimed in claim 6 in which
  (j) the offset means comprises
  (k) a terminal long leg of the wire having a free end for engaging the base of the slot,
  (l) a short leg joining with the upper end of the long leg in an inverted V formation and
  (m) said short leg connecting at its lower end in a V-crimp with the trailing end of the wire.

8. A cotton picking spindle as claimed in claim 1 in which said barb means comprises
  (h) a plurality of barbs,
  (i) a single elongated blade carrying in common all of said barbs, said stop means comprising
  (j) fixedly spaced shoulders at end portions of the blade, and
  (k) fixedly spaced bridge stops on the body at least partially across the slot at spaced axial distances substantially equal to the spacing of the shoulders
  (l) so that the shoulders abut the bridge stops when the elastic means is inserted beneath the blade.

9. A cotton picking spindle comprising a slotted spindle body in which
  (a) the slot opens substantially radially through the surface of the body and at an end thereof,
  (b) barb means in the slot,
  (c) elastic means adapted to enter through the open end of the slot beneath the barb means for moving the barb means outwardly in the slot, and
  (d) stop means for limiting the extent of the outward movement of the barb means to control the degree of projection of the barb means beyond the perimeter of the spindle body.

10. A cotton picking spindle as claimed in claim 9 in which said barb means comprises
  (e) a thin flat blade having inner and outer longitudinal edges,
  (f) a plurality of barbs extending from the outer edge of the blade, said slot having
  (g) closely spaced side walls for giving side support to the thin blade to hold the blade to a uniform rectilinear position throughout its length and to give stability to the plurality of barbs.

11. A spindle for cotton pickers adapted for rotation comprising
  (a) a substantially solid spindle body having
  (b) a longitudinal slot open through the outer surface of the body,
  (c) an elongated barb member movable transversely of the spindle body,
  (d) a plurality of barbs on the barb member adapted to be projected and retracted out of and into the slot incident to the transverse movement of the barb member,
  (e) stop means between the spindle body and barb member for limiting the transverse movement in an outer direction of the barb member to determine the degree of barb projection beyond the slot, and
  (f) projecting means for moving the barb members transversely outward of the slot within the limits prescribed by the stop means.

12. A spindle for cotton pickers as claimed in claim 11 in which said projecting means comprises
  (g) elastic means in the slot beneath the barb member biasing the latter yieldably to an outer position determined by the stop means.

13. A spindle for cotton pickers comprising
  (a) an elongated blade having
  (b) a plurality of barbs extending from an elongated edge thereof, said blade having
  (c) stop shoulders stepped down from the height of the barbs at opposite end portions and extending lengthwise of the blade,
  (d) transversely extending stop members at end portions of the blade,
  (e) a spindle body having a slot opening through the perimeter thereof of a width to snugly receive the blade and a depth deeper than the width of the blade including the tips of the barbs to permit the barbs to and including the tips to be contained wholly within the slot,
  (f) bridge stops on the spindle body projecting at least partially across the slot at spaced points positioned to receive said shoulders to limit outward movement of the blade and to receive in lapping engagement the transversely extending stop members to restrict longitudinal sliding movement of the blade in the slot, and (g) elastic means insertable through an end of the slot beneath the blade to pry the blade outwardly to a position where the shoulders engage the inner portions of the bridge stops and the stop members lap the bride stops.

14. A cotton picking spindle comprising
    (a) a spindle body having
    (b) a longitudinal slot open through the outer surface of the body,
    (c) bridge stops at spaced points at least partially across the slot,
    (d) an elongated barb member longer than the distance between the bridge stops adapted to be assembled to the spindle by entering a leading end of the barb member diagonally through the opening in the slot between the bridge stops and beneath the far bridge stop until the trailing end of the barb member clears the near bridge stop whereupon the barb member descends to the bottom of the slot,
    (e) stop members on the barb member spaced apart substantially equally with the distance between bridge stops for engaging the bridge stops to limit projection of the barbs but initially displaced from registration owing to the sliding movement of the leading end of the barb member beneath the far bridge stop,
    (f) second stop members at leading and trailing ends on the barb member adapted to lap the bridge stops for limiting longitudinal movement of the barb member,
    (g) means for shifting the barb member longitudinally in an opposite sense to that of the initial movement for registering the stop members with the bridge stops to limit the transverse outward movement of the barb member and to restrict longitudinal movement of the barb member so that said registration may be retained, and
    (h) means for elevating the barb member in the slot to a height for lapping the second stop members with the bridge stops.

15. A cotton picking spindle as claimed in claim 14 in which said second stop members comprise
    (i) at least two transverse stop walls at the leading end portion of the barb member,
    (j) one of said walls at substantially barb level for impinging the far bridge stop to arrest initial entry movement of the barb member,
    (k) another of said walls displaced from the first wall both longitudinally rearward of the first wall and stepped down transversely from the first wall,
    (l) said another wall spaced from the second stop member at the trailing end of the barb member a distance just short of the distance between the bridge members.

16. For use with a cotton picking spindle having at least one narrow slot therein opening through a side of the spindle, and longitudinally spaced stop members bridging at least in part the opening of the slot, a barb member comprising
    (a) a thin blade of single thickness,
    (b) a row of barbs projecting from an edge of the blade which is outermost in the position of the blade within the slot, said blade having
    (c) complemental stop parts located at end portions of the blade in substantial transverse alignment with the bridge stop members in the final position of the blade in the slot.

17. For use with a cotton picking spindle having at least one narrow slot having a bottom portion and opening out radially of the spindle and having stop means at least partially across the slot at outer end portions thereof, a barb member comprising
    (a) a thin blade of single thickness and radial dimension less than the distance between the slot bottom portion and the stop means to permit of radial movement of the blade in the slot within the limits of the bottom portion and stop means,
    (b) said blade elongated to occupy the major length of the slot, and
    (c) a plurality of barbs on the outer longitudinal edge of the blade adapted to project beyond the slot at least in the outer position of the blade against the stop means.

References Cited in the file of this patent
UNITED STATES PATENTS

| | | |
|---|---|---|
| 2,645,892 | Weems | July 21, 1953 |
| 2,667,725 | Voigt | Feb. 2, 1954 |
| 2,787,110 | Call | Apr. 2, 1957 |
| 3,017,734 | Scholtes | Jan. 23, 1962 |